United States Patent
Kogan et al.

(10) Patent No.: US 11,038,844 B2
(45) Date of Patent: Jun. 15, 2021

(54) SYSTEM AND METHOD OF ANALYZING THE CONTENT OF ENCRYPTED NETWORK TRAFFIC

(71) Applicant: AO Kaspersky Lab, Moscow (RU)

(72) Inventors: Sergey V. Kogan, Moscow (RU); Denis V. Rodionov, Moscow (RU); Alexander N. Makarov, Moscow (RU); Alexey S. Totmakov, Moscow (RU); Petr Y. Kolmakov, Moscow (RU)

(73) Assignee: AO Kapersky Lab, Moscow (RU)

( * ) Notice: Subject to any disclaimer, the term of this patent is extended or adjusted under 35 U.S.C. 154(b) by 297 days.

(21) Appl. No.: 16/275,841

(22) Filed: Feb. 14, 2019

(65) Prior Publication Data
US 2020/0007503 A1    Jan. 2, 2020

(30) Foreign Application Priority Data

Jun. 29, 2018 (RU) .......................... RU2018123684

(51) Int. Cl.
*H04L 29/06* (2006.01)
*H04L 12/721* (2013.01)

(52) U.S. Cl.
CPC .......... *H04L 63/0245* (2013.01); *H04L 45/70* (2013.01); *H04L 63/0485* (2013.01); *H04L 63/062* (2013.01); *H04L 63/1408* (2013.01); *H04L 63/1425* (2013.01); *H04L 63/1441* (2013.01); *H04L 63/30* (2013.01)

(58) Field of Classification Search
CPC ............ H04L 63/1408; H04L 63/1425; H04L 63/1441; H04L 63/30; H04L 63/0245; H04L 63/0485; H04L 63/062; H04L 45/70
See application file for complete search history.

(56) References Cited

U.S. PATENT DOCUMENTS

| | | | |
|---|---|---|---|
| 9,626,509 B1 | 4/2017 | Khalid et al. | |
| 9,800,560 B1 | 10/2017 | Guo et al. | |
| 9,893,897 B2 | 2/2018 | Li et al. | |
| 10,079,810 B1* | 9/2018 | Moore | H04L 63/0428 |
| 10,277,562 B1* | 4/2019 | Frederick | H04L 9/006 |
| 2007/0186281 A1 | 8/2007 | Mcalister | |

(Continued)

*Primary Examiner* — Thaddeus J Plecha
(74) *Attorney, Agent, or Firm* — Arent Fox LLP; Michael Fainberg

(57) ABSTRACT

Systems and methods for analyzing content of encrypted traffic between processes are disclosed herein. According to one aspect, an exemplary method comprises rerouting traffic between a first process executing on a first computing device and a second process, to a server, to determine that there is a protected connection established between the first process and the second process, determining information related to an application pertaining to the first process, obtaining a session key for the protected connection by calling a function, wherein the information comprises an address of the function to call to obtain the session key, decrypting and analyzing the rerouted traffic on the server between the first process and the second process using the session key to determine whether the traffic contains malicious objects and in response to determining the traffic contains malicious objects, counteracting the malicious objects by blocking or rerouting the traffic.

17 Claims, 4 Drawing Sheets

(56) References Cited

U.S. PATENT DOCUMENTS

| | | |
|---|---|---|
| 2009/0106551 A1 | 4/2009 | Boren |
| 2010/0100963 A1 | 4/2010 | Mahaffey et al. |
| 2011/0264905 A1 | 10/2011 | Ovsiannikov |
| 2011/0314270 A1* | 12/2011 | Lifliand .................. H04L 63/30 |
| | | 713/151 |
| 2012/0066698 A1 | 3/2012 | Yanoo |
| 2012/0201142 A1* | 8/2012 | Brabson .................. H04L 43/18 |
| | | 370/241 |
| 2014/0122454 A1* | 5/2014 | Brylyn .................... G06F 16/93 |
| | | 707/705 |
| 2015/0007316 A1* | 1/2015 | Ben-Shalom ........... H04L 63/12 |
| | | 726/23 |
| 2015/0120959 A1* | 4/2015 | Bennett ................... H04L 47/10 |
| | | 709/233 |
| 2017/0315999 A1* | 11/2017 | Patil ....................... G06F 16/164 |
| 2019/0306132 A1* | 10/2019 | Le Van Gong ....... H04L 63/068 |
| 2020/0193017 A1* | 6/2020 | Bannister .............. G06F 21/629 |
| 2020/0236093 A1* | 7/2020 | Bannister .............. H04L 9/0861 |

* cited by examiner

SYSTEM AND METHOD OF ANALYZING THE CONTENT OF ENCRYPTED NETWORK TRAFFIC

CROSS REFERENCE TO RELATED APPLICATIONS

This application claims benefit of priority under 35 U.S.C. § 119(a)-(d) to Russian Patent Application No. 2018123684, filed Jun. 29, 2018, the entire contents of which are incorporated herein by reference.

FIELD OF TECHNOLOGY

The present disclosure relates to systems and methods for analysis of protected network connections and more specifically to systems and methods of analyzing the content of encrypted network traffic to detect malicious objects.

BACKGROUND

In a reliable solution for antivirus protection of computer systems, several layers of protection should be provided. One such layer is the protection of the users against cyber threats when connected to the Internet by analyzing network traffic. In order to secure computer systems, antivirus protection performs analysis by routing network traffic through a proxy server. The proxy server extracts and analyzes the data of web site pages (HTML), files of various types (executable files, images, text documents, etc.), scripts, and the like to ensure user and computer security. Data in the context of a web browser's connections to remote web servers may be transmitted in open and in encrypted form. The Internet standard for protection of data transmissions at present is the transport layer cryptographic protection protocol (Transport Layer Security, TLS), which is used together with standard data transmission protocols forming, for example, the HTTPS (Hypertext Transfer Protocol Secure) protocol. In order to provide access to encrypted data of network traffic for the security systems, the proxy server substitutes the certificate of the web site in the course of the "handshake" procedure when establishing the protected connection. In the case of HTTPS connections, this results in the web browsers finding a non-original certificate for the web site and notifying the user about this. Alternatively, in the case of EV (Extended Validation) certificates, which are certificates of high reliability, the EV status is additionally lost at the web site, as indicated by the green bar alongside the address string of the web browser. The presence of the green bar tells the visitors that the web site is genuine. As a result, the intervention in the protected data transmission protocols in the context of a connection between a web browser and a web site leads to a negative impression for the users of antivirus solutions and a lower user experience (UX) criterion. Another example of applications (besides web browsers) needing an analysis of the network traffic for protecting a user against cyber threats on the Internet is messengers (Instant Messenger, or IM).

The claimed invention makes it possible to perform an analysis of the content of encrypted network traffic without intervening in the security protocols when establishing the protected connection.

Aspects of the disclosure propose methods and systems that analyze the content of encrypted network traffic without intervention in the security protocols during the establishing of a protected connection.

SUMMARY

Aspects of the present disclosure are directed to systems and methods of analyzing the content of encrypted network traffic to detect malicious objects.

The technical result of the present disclosure is to expand the arsenal of tools designed to accomplish the purpose of the proposed invention.

In some aspects, an exemplary method comprises rerouting traffic between a first process executing on a first computing device and a second process, to a server, to determine that there is a protected connection established between the first process and the second process, determining information related to an application pertaining to the first process, obtaining a session key for the protected connection by calling a function, wherein the information comprises an address of the function to call to obtain the session key, decrypting and analyzing the rerouted traffic on the server between the first process and the second process using the session key to determine whether the traffic contains malicious objects, and in response to determining the traffic contains malicious objects, counteracting the malicious objects by blocking or rerouting the traffic.

In one aspect, the method further comprises injecting a program module into an address space of the first process and obtaining the session key by instructing the program module to intercept a function called in establishing the protected connection.

In one aspect, the information related to the application is determined by querying the database containing a list of address of functions that return the session key for a plurality of applications.

In one aspect, the method further comprises finding the function in an import table of the application using the address retrieved from the database and placing a pointer to an intercepting function that copies the session key in place of the function called in establishing the protected connection.

In one aspect, the information is determined based at least on the version of the application.

In one aspect, the method further comprises verifying, prior to intercepting, compatibility of the version of the application with the method of analysis of content of the traffic between the first process and the second process.

In one aspect, the information is determined using program debugging files.

In one aspect, the server is a proxy server and the analysis is performed synchronously, wherein the traffic rerouted through the proxy server is delayed until analysis is complete and the malicious objects are removed from the traffic.

In one aspect, the server is a proxy server and the analysis is performed asynchronously, wherein the analysis is performed continuously without delaying traffic rerouted through the proxy server.

In one aspect, the application is a web browser.

According to other exemplary aspects of the disclosure, a system is provided for analysis of content of encrypted traffic between processes. In some aspects, the system comprising: a processor configured to reroute traffic between a first process executing on a first computing device and a second process, to a server, to determine that there is a protected connection established between the first process and the second process, determine information related to an application pertaining to the first process, obtain a session key for the protected connection by calling a function, wherein the information comprises an address of the function to call to obtain the session key, decrypt and analyzing the rerouted traffic on the server between the first process and the second process using the session key to determine whether the traffic contains malicious objects and in response to determining the traffic contains malicious objects, counteract the malicious objects by blocking or rerouting the traffic.

The present disclosure further provides a computer readable medium storing instructions thereon for executing the methods described above.

The above simplified summary of example aspects of the disclosure serves to provide a basic understanding of the disclosure. This summary is not an extensive overview of all contemplated aspects, and is intended to neither identify key or critical elements of all aspects nor delineate the scope of any or all aspects of the disclosure. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for analyzing the content of encrypted network traffic for malicious objects. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Encryption is an obvious method of concealing information from outside parties in the process of its transmittal. However, occasionally for purposes of ensuring the security, intercepted traffic is also decrypted in order to scan for the presence of signs of suspicious network activity, for example. One of the most widespread protocols at present, ensuring a protected transmission of data between nodes on the Internet, is the Transport Layer Security (TLS) protocol. This protocol is widely used in applications working with the Internet, such as web browsers, applications working with email, the exchanging of instant messages, and IP telephony (VoIP or Voice over Internet Protocol). Asymmetrical crypto-systems (with a public key) are not suited to a rapid transmittal of data streams. Therefore, symmetrical ciphers are used for encrypting data within a TLS session. These are usually block ciphers. In symmetrical ciphers, the identical key is used for the encrypting and decrypting. This key is called the session encryption key. The nodes agree on the symmetrical session encryption keys in the process of establishing the protected connection (handshake). Thus, after establishing the connection, the session encryption key is possessed by each side. It should be noted that the client (the web browser) initiates establishing the protected connection with the server (the web site). Upon such a request, in one of the variant aspects of the proposed invention, the proxy server may detect the establishing of a protected connection. In order to perform the analysis of the encrypted network traffic in the context of the proposed invention, the antivirus protection means must obtain the session encryption key.

Figure 1:
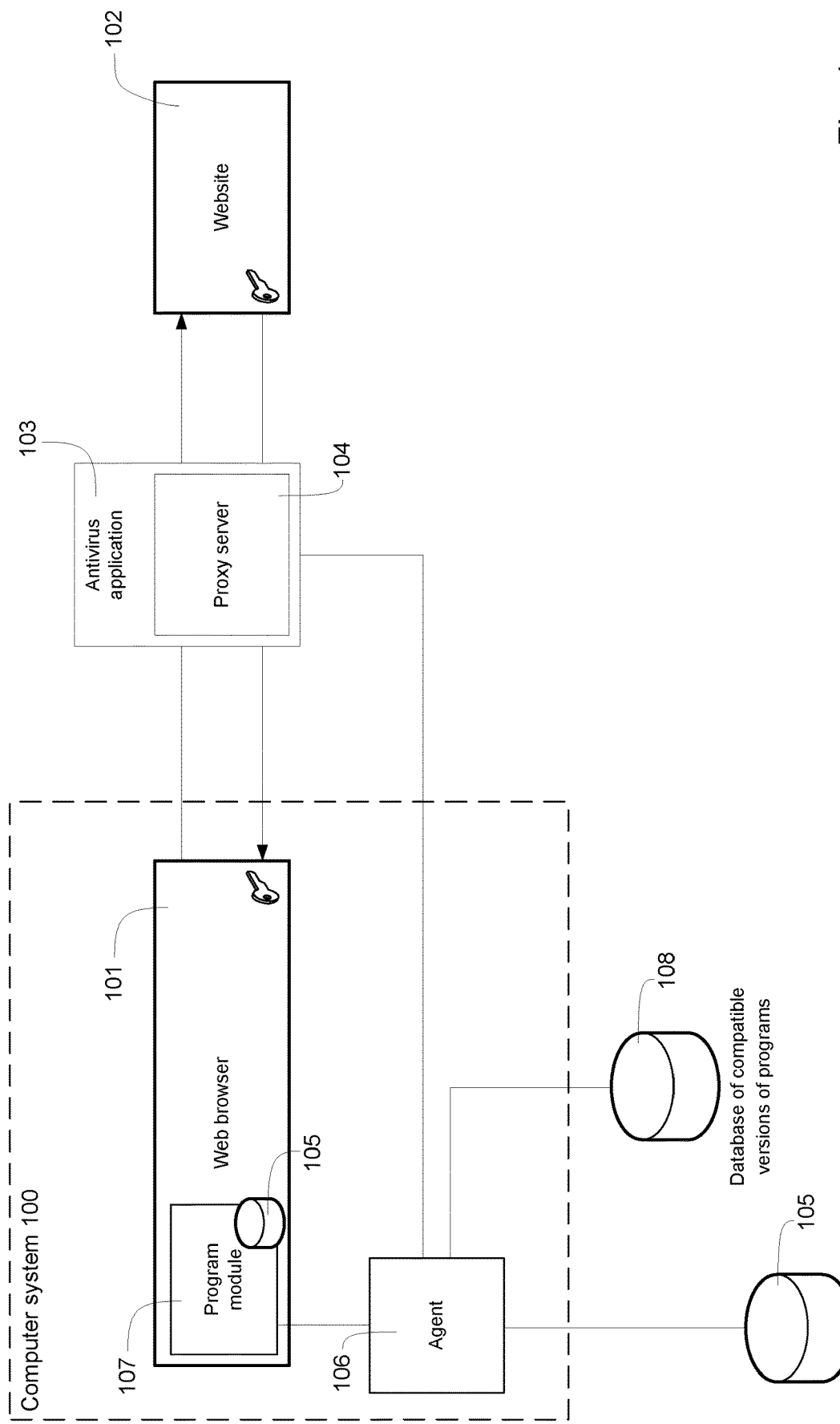
FIG. 1 illustrates a block diagram of a system of analyzing the content of encrypted network traffic between a web browser and a web site, in accordance with exemplary aspects of the present disclosure.

An example of a system of analyzing the content of encrypted network traffic between a web browser and a web site is shown in FIG. 1. The figure shows a computer system 100 on which are running a web browser 101 and agent 106. A web browser 101 and an agent 106 are processes that are executed on the computing device of the user of a computer system 100. In one variant aspect, an antivirus protection means 103 and a proxy server 104 running under the control of the antivirus protection means 103 are executed on a remote server. In this variant, the agent 106 is a security application (such as an antivirus application) or a portion thereof and it is executed on the computer system 100. In another variant aspect, the antivirus protection means 103 is a security application (such as an antivirus application) and it is executed on the computing device of the user of the computer system 100. In this variant, the proxy server 104 and the agent 106 are means running on the computer system 100 under the control of the antivirus protection means 103.

The network traffic between the web browser 101 and a website 102 flows through the proxy server 104. The agent 106 has access to a database 105 containing the information needed for the agent 106 to obtain the session encryption key. The agent 106 transfers the session key so obtained to the antivirus protection means 103. The database 105 is kept on a remote server or in a cloud service and in one variant aspect it has a local copy which is kept on the computer system 100 and synchronized with the remotely residing database 105. The agent 106 also has access to a database of compatible program versions 108, that, similar to the database 105, is kept on a remote server or in a cloud service. In one variant aspect, there is a local copy of the database kept on the computer system 100 and synchronized with the remotely residing database of compatible program versions 108.

The proxy server 104 within the claimed invention is a means allowing the antivirus protection means 103 to perform a search for and a deletion of all kinds of viruses, worms, Trojan horses and other malicious programs in the data stream between the web browser 101 and the website 102.

In one variant aspect, the antivirus protection means 103 is able to perform any combination of functions related to the security of the computer system 100, such as: counteracting malicious objects, detecting and deleting malicious objects, and neutralizing threats. These functions related to the security are described below only in general outline, as an illustration, and they do not constitute an exhaustive list of the functions relating to security under consideration.

Various other functions relating to security may be used in addition to or in place of any of the functions relating to security and cited as an example in the present document.

Counteracting malicious objects involves blocking malicious objects, such as viruses, worms, and other malicious programs, advertising software, key logger programs, spam and so forth. Counteracting the malicious objects may also include blocking of unwanted traffic (by the proxy server 104), such as hacker attacks, before any of these objects is able to realize its malicious potential on the computer system 100. Blocking the unwanted traffic may include blocking or rerouting the traffic content using the firewall, and also by the proxy server 104.

The detection and removal of malicious objects is employed for objects which have gotten past the checks designed to prevent penetration and are now present in one form or another on the local device 100, including when the analysis of the network traffic on the proxy server 104 is being done in an asynchronous mode.

The neutralization of threats is employed to detect unwanted content and to detect attacks or threats in real time and it involves taking steps to shut down any suspicious programs or processes, to block the network traffic by the antivirus protection module 103, and to restore the system to its last known secure condition. The antivirus protection module 103 contains a set of components such as a firewall, a filter of email messages, an antivirus module/module for blocking of unwanted content/utility for removal of malicious software, a system for backup data copying and restoration, and also an intrusion prevention and detection system (IPS/IDS). These components may work in various combinations to realize the different functions of the antivirus protection module 103.

In order to gain access to the session encryption key, the agent 106 running under the control of the antivirus protection means 103 introduces a program module 107 into the address space of the process of the web browser 101. The program module 107, using information from the database 105, determines the address of the API function (or simply a function) which allows it to obtain the session encryption key. In one variant aspect, the calling of the given API function returns the generated session encryption key. In another variant aspect, the given API function is characterized in that a buffer containing the generated session encryption key is transferred to it as input parameters.

For obvious reasons, the information about such API functions is not documented, and as a result it is not publicly available. Moreover, each version of the web browser 101 may have different API functions residing at different addresses. The program code of the web browsers 101 ending up on the computer systems 100 of the users is a sequence of bytes in hex code, not containing data allowing an identification of functions. For example, the API function being sought is called GetTLSKey( ), but during the assembly of the application of the web browser 101, all the names of the functions are removed by the compiler. Only the addresses remain at which the calls of the corresponding functions occur. For example, instead of the name of the API function GetTLSKey( ), an address of the kind 0x80555f1 is indicated.

The database 105 contains a list of the addresses of the sought API function, corresponding to the versions of the web browsers 101. The database 105 is formed and constantly updated by specialists in computer security (such as the specialists of an antivirus company) by methods of reverse engineering. It is also possible to use PDB (program database) files to determine the address of the sought API function—these are program-debugging files, special files containing debugging symbols in which information is found as to which addresses correspond to which variables and functions. For example, by utilizing a certain PDB file one may learn that the variable at the address 0x80484e1 is called tlsKey, while the function at the address 0x80555f1 is called GetTLSKey( ). The PDB files containing the sought information are not made public and may only be obtained directly from the company developing the application in question (such as a web browser). For each version of a web browser 101 it is necessary to obtain the corresponding PDB, find out which API function is needed, and find its address in the PDB, in order to add a record to the database 105.

In one variant aspect, the program module 107 to be introduced into the address space of the web browser 101 may intercept the mentioned sought API function which is called up in the process of establishing the protected connection. The technology of intercepting API function calls involves various approaches, which may be employed in the context of the present disclosure. One of the approaches is based on the fact that the calls of any given API functions in a process corresponding to a web browser 101 from the DLL libraries are carried out through a function import table. This table is filled in during the loading of the DLL into the process, and the addresses of all imported functions which might be needed by the process are written therein. The functions may include the API function that receives, as one of its arguments, the session encryption key generated in the process of establishing the protected connection. Accordingly, in order to intercept the API function call, the program module 107 will find the import table, and in it using the address from the database 105 it will find the API function whose call needs to be intercepted, and it places in the found import table a pointer to another function in place of the original API function. The other function whose pointer is placed in the import table in place of the original API function is a function allowing the copying of the session encryption key and a transfer of control back to the original API function.

The database 105 contains a list of the addresses of the API functions corresponding to the versions of the web browser 101, where the API functions are characterized in that they receive, as one of their arguments, the session encryption key generated in the process of establishing the protected connection.

In another aspect of the disclosure, a method of analyzing the content of encrypted network traffic between the web browser 101 and the web site 102 is provided. According to this method, a list of addresses of API functions corresponding to the versions of the web browser 101 is stored in the database 105. The API functions are characterized in that they receive, as one of their arguments, the session encryption key generated in the process of establishing the protected connection. The antivirus protection module 103 is used to route network traffic between the web browser 101 and the web site 102 through the proxy server 104. The request to establish a protected connection between the web browser 101 and the website 102 may be discovered with the aid of the proxy server 104 (or with the aid of the antivirus protection means 103 under the control of which the proxy server 104 is running). With the aid of the agent 106, the program module 107 is introduced into the address space of the web browser 101 and with its aid the call of the API function is intercepted at the address corresponding to the version of the web browser 101 in the database 105, and a copy of the session encryption key is obtained. In another variant aspect, the program module 107 introduced into the address space of the web browser 101 is used to obtain the session encryption key by means of a call for the API function at an address corresponding to the version of the web browser 101 from the list in the database 105. With the aid of the agent 106, the obtained session encryption key is transferred to the antivirus protection means 103. And with the aid of the antivirus protection means 103, an analysis is made of the network traffic between the web browser 101 and the website 102, decrypted by a copy of the session encryption key.

In the context of the proposed invention, the analysis of the network traffic between the web browser 101 and the web site 102 may be done either in synchronous or in asynchronous mode. In synchronous mode, the transmission of the data passing through the proxy server 104 is held up for the time needed to perform the analysis by the antivirus protection module 103. Data found to be malicious according to the results of the analysis is removed from the network traffic. In asynchronous mode, the analysis of the data stream is done with no delay.

Figure 4:
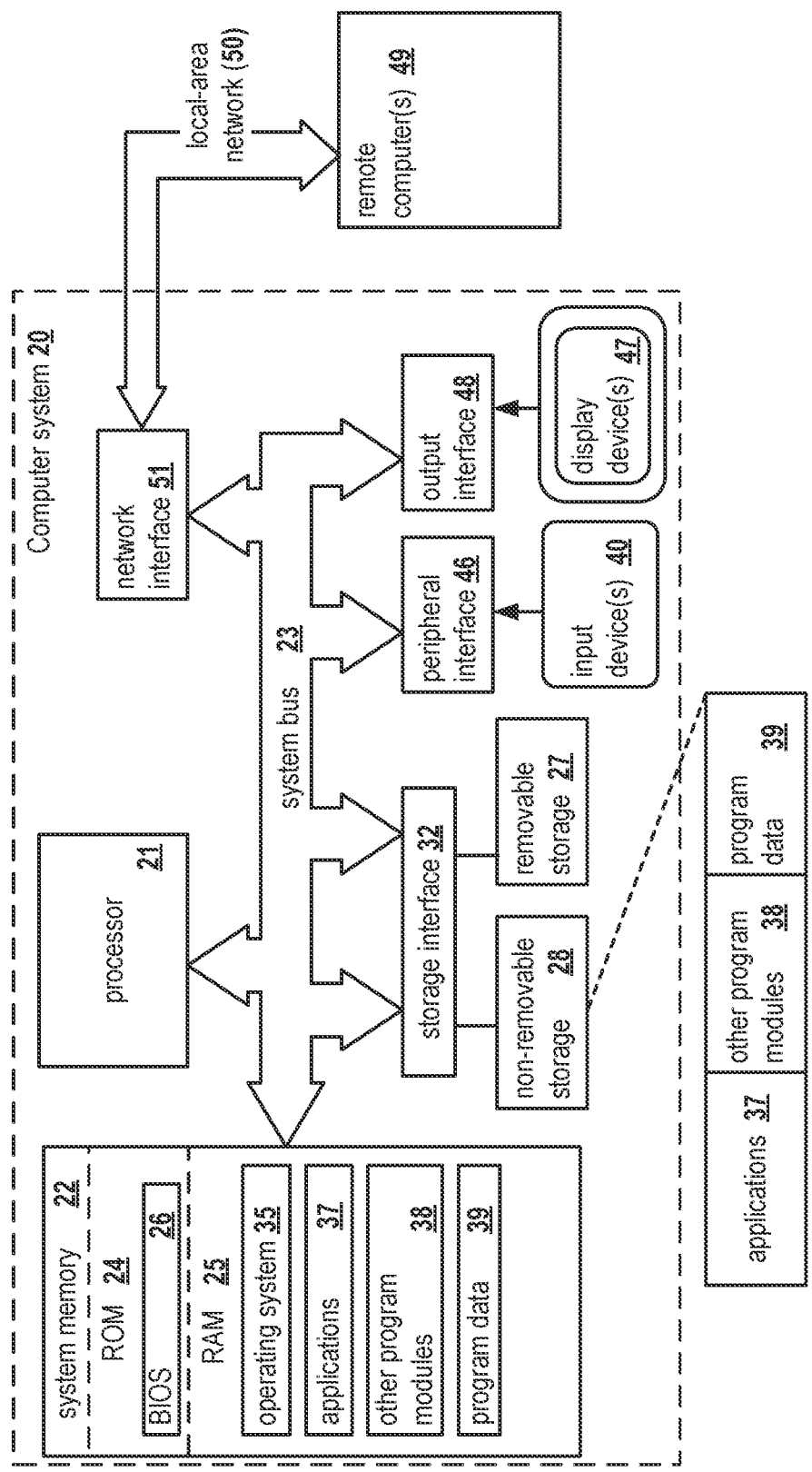
FIG. 4 shows an example of a general-purpose computer system, in accordance with exemplary aspects of the present disclosure.

In the present disclosure, at least portions of the antivirus protection module 103, the proxy server 104 and the database 105 may be implemented on the processor of a general-purpose computer (such as the one shown in FIG. 4).

Figure 2:
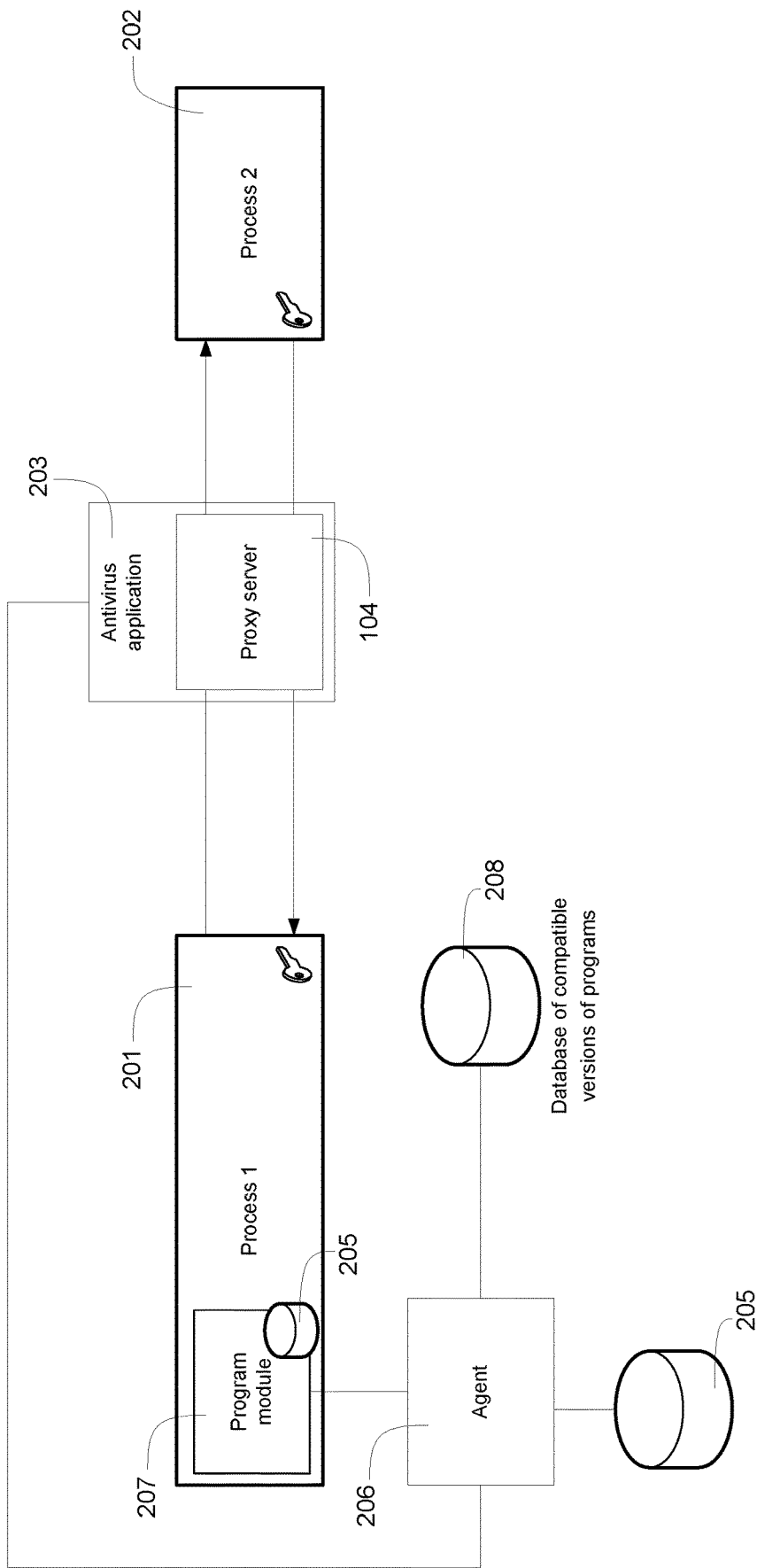
FIG. 2 illustrates the architecture of the system of analyzing the content of encrypted traffic between processes, in accordance with exemplary aspects of the present disclosure.

FIG. 2 shows a preferred variant aspect of the system of analysis of the content of encrypted traffic between processes. In one variant embodiment, the protected connection is established between two processes, the process 201 (the first process) and the process 202 (the second process). The process is an application that is being executed on the processor of the computer system. Furthermore, the application is characterized in that the application contains an internal realization of the cryptographical protocols designed to establish a protected connection to another application within which the network traffic being transferred between them is encrypted. In one variant embodiment, the processes execute on different computer systems: the process 201 executes on a first computer system, while the process 202 executes on a second computer system. In another variant embodiment, the process 201 and the process 202 execute on the same computer system.

In one variant embodiment, an agent 206 is also a process which is executed on a first computer system, while an antivirus protection means 203 and a proxy server 104 under the control of which the antivirus protection means 203 is running are executed on a remote server. In this variant, the agent 206 is a security application (such as an antivirus application). In another variant embodiment, the antivirus protection means 203 is a security application (such as an antivirus application) and it is executed on the first computer system. In this variant, the proxy server 104 and the agent 206 are means running on the first computer system under the control of the antivirus protection means 203. The encrypted network traffic between the process 201 and the process 202 flows through the proxy server 104.

The agent 206 has access to a database 205 containing a list of function addresses, characterized in that it returns the session encryption key generated when establishing the protected connection between the process 201 and the process 202. In addition, the addresses of the mentioned function correspond to different applications and their versions. The agent 206 transfers the session key so obtained to the antivirus protection means 203. In another variant embodiment, the agent 206 transfers the session key so obtained to the proxy server 104, which is under the control of the antivirus protection means 203. The database 205 is kept on a remote server or in a cloud service and in one variant embodiment it has a local copy which is kept on the first computer system and synchronized with the remotely residing database 205.

The agent 206 also has access to a database of compatible program versions 208, that, similar to the database 205, is kept on a remote server or in a cloud service. In one variant aspect, the database is kept locally on the first computer system and is synchronized with the remotely residing database of compatible program versions 208. In one variant aspect, the agent 206 before introducing a program module 207 into the address space of the process 201 verifies the compatibility of the introducing technology and/or of the program module 207 with the version of the application pertaining to the process 201. If the version and the name of the application corresponding to the process 201 are contained in the database of compatible program versions 208, the agent 206 carries out the introduction of the program module 207 in the address space of the process 201. Absence of the version and name of the application corresponding to the process 201 means that the method provided in the claimed invention cannot be applied to the process 201.

In a general variant aspect of the claimed invention, a method is carried out for analysis of the content of encrypted traffic between the process 201 and the process 202. According to this method, a list of function addresses is kept in the database 205. The database 205 returns the session encryption key that was generated while establishing a protected connection between the process 201 and the process 202. The program module 207 is introduced with the aid of the agent 206 into the address space of the process 201. In one variant aspect, the mentioned list from the database 205 is contained inside the program module 207 being introduced into the address space of the process 201. The traffic between the process 201 and the process 202 is rerouted through the proxy server 104 with the aid of the agent 206 (or with the aid of the antivirus protection means 203 under the control of which the agent 206 is running).

The proxy server 104 discovers the protected connection between the process 201 and the process 202. With the aid of the program module 207 introduced into the address space of the process 201, the session encryption key is obtained by a function call at the address corresponding to the version of the application from the mentioned list from the database 205. With the aid of the antivirus protection means 203, the traffic between the process 201 and the process 202 is analyzed after the traffic is decrypted with the aid of the session encryption key. Furthermore, in one variant embodiment, before introducing the program module 207 into the address space of the process 201, a verification is made of the compatibility of the current version of the application corresponding to the process 201 with mentioned method for analysis of the content of the encrypted traffic between the process 201 and the process 202 according to the database of compatible program versions 208.

The proxy server 204 discovers the protected connection between the process 201 and the process 202. With the aid of the program module 207 introduced into the address space of the process 201, the session encryption key is obtained by a function call at the address corresponding to the version of the application from the mentioned list from the database 205. With the aid of the antivirus protection means 203, the traffic between the process 201 and the process 202 is analyzed after the traffic is decrypted with the aid of the session encryption key. Furthermore, in one variant embodiment, before introducing the program module 207 into the address space of the process 201, a verification is made of the compatibility of the current version of the application corresponding to the process 201 with mentioned method for analysis of the content of the encrypted traffic between the process 201 and the process 202 according to the database of compatible program versions 208.

Figure 3:
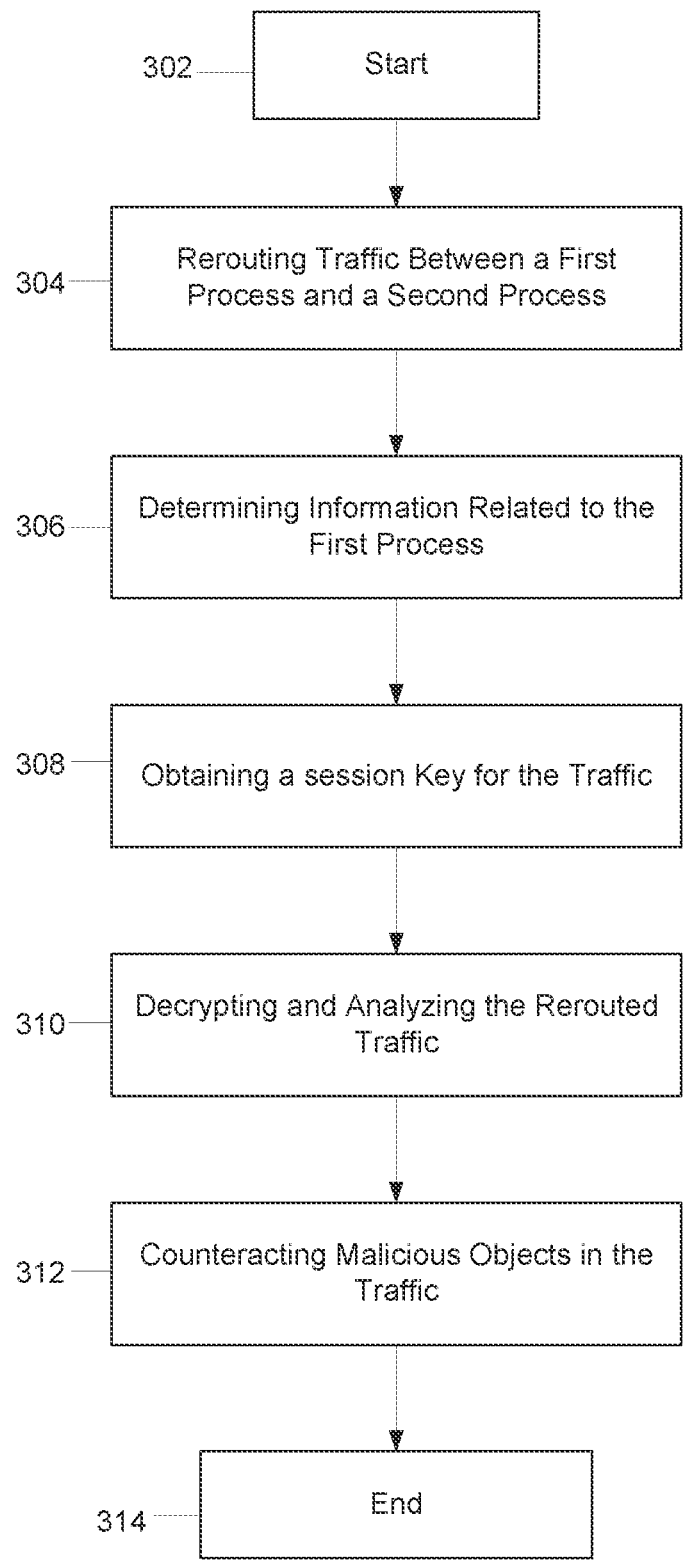
FIG. 3 is a flow diagram of a method for analyzing the content of encrypted network traffic between a web browser and a web site, in accordance with exemplary aspects of the present disclosure.

FIG. 3 is a flow diagram of a method for analysis of content of encrypted traffic between processes.

The method begins at step 302 and proceeds to step 304. At step 304, the traffic between a first process executing on a first computing device and a second process is rerouted to a server. In some aspects, the server may be a proxy server (e.g. proxy server 104) or the like. In some aspects, the second process may be a remote process, or a process that also executes on the same computing device executing the first process. The traffic is rerouted in order to determine whether there is a protected connection being established between the two processes. In some aspects, this protected connection encrypts all information/traffic transmitted over the connection. In some aspects, an agent (e.g., agent 206 of FIG. 2) performs the rerouting.

At step 306, information related to an application pertaining to the first process is determined. In some aspects, determining the information related to an application comprises querying a database for the information related to the application based on application data, such as version number of the application, name of the application or the like, and receiving the information related to the application. In some aspects, the information related to the application includes addresses of functions that are intercepted to obtain a session key. The session key is used to decrypt the traffic between the two processes. In some aspects, the functions are intercepted by introducing a program module (e.g., program module 207) into the address space of the first process.

At step 308, using the information related to the application, the session key is obtained. For example, the agent 206, in some aspects, introduces the program module 207 into the first process. The program module 207 may place the address of a new function call at the address of the old function that receives a session key indicated in the information related to the application. Instead of the first process sending the session key to the originally intended function, the session key is sent to the new function whose address was placed in the address space of the process. The session key is then obtained by the new function.

At step 310, the obtained session key is used to decrypt the traffic that was rerouted to the server. The traffic is then analyzed to search for malicious objects in the traffic. In some aspects, the analysis is performed synchronously, where analyzing further traffic is delayed until malicious objects found in the traffic currently being analyzed is removed or counteracted. In other aspects, the analysis is performed asynchronously and continues without delay or regard to whether other malicious objects have been removed or counteracted.

At step 312, the malicious objects found in the rerouted traffic are counteracted. In some aspects, counteracting the malicious objects includes removing the malicious objects from the traffic, replacing the malicious objects in the traffic, or disabling the malicious objects.

The method terminates at 314.

FIG. 4 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

In one aspect, the hard disk 27, the removable magnetic disk 29 and the removable optical disk 31 may be connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for analysis of content of encrypted traffic between processes, the method comprising:
  rerouting to a server traffic between a first process executing on a first computing device and a second process to determine that there is a protected connection established between the first process and the second process;
  determining information about an application associated with the first process, wherein the information is based at least on a version of the application and includes an address of a function that obtains a session key for the protected connection;
  obtaining the session key for the protected connection by calling the function;
  verifying compatibility of the version of the application with a method of analysis of content of the rerouted traffic;
  decrypting the rerouted traffic using the session key and analyzing the rerouted traffic on the server using a compatible method to determine whether the traffic contains malicious objects; and
  in response to determining the traffic contains malicious objects, counteracting the malicious objects by blocking or rerouting the traffic.

2. The method of claim 1, further comprising:
  injecting a program module into an address space of the first process; and
  obtaining the session key by instructing the program module to intercept a function called in establishing the protected connection.

3. The method of claim 2, wherein the information related to the application is determined by querying a database containing a list of addresses of functions that return the session key for a plurality of applications.

4. The method of claim 3, further comprising:
  finding a function to call in an import table of the application using the address retrieved from the database; and
  placing a pointer to an intercepting function that copies the session key in place of the function called in establishing the protected connection.

5. The method of claim 1, wherein the information is determined using program debugging files.

6. The method of claim 1, wherein the server is a proxy server and the analysis is performed synchronously, wherein the traffic rerouted through the proxy server is delayed until analysis is complete and the malicious objects are removed from the traffic.

7. The method of claim 1, wherein the server is a proxy server and the analysis is performed asynchronously, wherein the analysis is performed continuously without delaying traffic rerouted through the proxy server.

8. The method of claim 1, wherein the application is a web browser.

9. A system for analysis of content of encrypted traffic between processes, the system comprising:

a hardware processor configured to:
reroute to a server traffic between a first process executing on a first computing device and a second process to determine that there is a protected connection established between the first process and the second process;
determine information about an application associated with the first process, wherein the information is based at least on a version of the application and includes an address of a function that obtains a session key for the protected connection;
obtain the session key for the protected connection by calling the function;
verify compatibility of the version of the application with a method of analysis of content of the rerouted traffic;
decrypt the rerouted traffic using the session key and analyze the rerouted traffic on the server using a compatible method to determine whether the traffic contains malicious objects; and
in response to determining the traffic contains malicious objects, counteract, by the server, the malicious objects by blocking or rerouting the traffic.

10. The system of claim 9, wherein the information is determined by querying a database containing a list of addresses of functions that return the session key for a plurality of applications.

11. The system of claim 10, the processor further configured to:
intercept a function called in establishing the protected connection.

12. The system of claim 11, the processor further configured to:
find a function to call in an import table of the application using the address retrieved from the database; and
place a pointer to an intercepting function that copies the session key in place of the function called in establishing the protected connection.

13. The system of claim 9, wherein the information is determined using program debugging files.

14. The system of claim 9, wherein the server is a proxy server and the analysis is performed synchronously, wherein the traffic rerouted through the proxy server is delayed until analysis is complete and the malicious objects are removed from the traffic.

15. The system of claim 9, wherein the server is a proxy server and the analysis is performed asynchronously, wherein the analysis is performed continuously without delaying traffic rerouted through the proxy server.

16. The system of claim 9, wherein the application is a web browser.

17. A non-transitory computer-readable medium, storing thereon computer-executable instructions for analysis of content of encrypted traffic between processes, the instructions comprising:
rerouting to a server traffic between a first process executing on a first computing device and a second process to determine that there is a protected connection established between the first process and the second process;
determining information about an application associated with the first process, wherein the information is based at least on a version of the application and includes an address of a function that obtains a session key for the protected connection;
obtaining the session key for the protected connection by calling the function;
verifying compatibility of the version of the application with a method of analysis of content of the rerouted traffic;
decrypting the rerouted traffic using the session key and analyzing the rerouted traffic on the server using a compatible method to determine whether the traffic contains malicious objects; and
in response to determining the traffic contains malicious objects, counteracting the malicious objects by blocking or rerouting the traffic.

* * * * *